(12) United States Patent
Kozak et al.

(10) Patent No.: US 7,197,885 B2
(45) Date of Patent: Apr. 3, 2007

(54) WATER SEPARATOR WITH RIBS

(75) Inventors: Eugene M. Kozak, Royal Oak, MI (US); Steven B. Marshall, Oxford, MI (US)

(73) Assignee: Valeo Climate Control Corp, Auburn Hills, MI (US)

( * ) Notice: Subject to any disclaimer, the term of this patent is extended or adjusted under 35 U.S.C. 154(b) by 246 days.

(21) Appl. No.: 10/954,565

(22) Filed: Sep. 30, 2004

(65) Prior Publication Data
US 2006/0064991 A1    Mar. 30, 2006

(51) Int. Cl.
*F25D 17/06* (2006.01)
(52) U.S. Cl. ............................................. 62/93; 62/283
(58) Field of Classification Search ............ 62/92, 62/93, 130, 171, 186, 272, 283, 427; 55/383.3, 55/413, 439, 462; 165/167, 229
See application file for complete search history.

(56) References Cited

U.S. PATENT DOCUMENTS

| | | | |
|---|---|---|---|
| 1,751,043 A * | 3/1930 | Lewis et al. ................. 165/229 |
| 4,456,456 A | 6/1984 | Pompei | |
| 4,584,838 A | 4/1986 | AbuJudom, II | |
| 4,844,687 A * | 7/1989 | Korthaus ................... 415/56.1 |
| 5,039,425 A * | 8/1991 | Caris et al. ................. 210/691 |
| 5,172,753 A | 12/1992 | Kadle et al. | |
| 5,277,656 A * | 1/1994 | Koukal et al. .............. 454/147 |
| 5,320,652 A * | 6/1994 | Akel et al. .................... 55/320 |
| 5,409,834 A | 4/1995 | Birdwell | |
| 5,514,193 A * | 5/1996 | Schaal et al. ................. 96/356 |
| 5,893,408 A * | 4/1999 | Stark ............................ 165/66 |
| 6,381,973 B1 | 5/2002 | Bhatti et al. | |
| 6,419,730 B1 * | 7/2002 | Chavez ......................... 96/189 |
| 6,510,739 B1 * | 1/2003 | Ollat et al. ................... 73/579 |
| 6,902,595 B2 * | 6/2005 | Darnell ........................ 55/396 |

FOREIGN PATENT DOCUMENTS

DE         3619935 A1 *   12/1987

* cited by examiner

*Primary Examiner*—Mohammad M. Ali
(74) *Attorney, Agent, or Firm*—Ronald Courtney

(57) ABSTRACT

In preferred aspects of the present invention, at least one rib is provided can be molded to an internal dividing wall in the interior of a water separator in an automotive HVAC unit. In more preferred aspects, a plurality of ribs is provided that are molded to or with the wall, and, the plurality of ribs form a pattern, in a way that allows them to 'direct' or to 'channel' water from an air flow.

14 Claims, 10 Drawing Sheets

WATER SEPARATOR WITH RIBS

FIELD OF THE INVENTION

The present invention relates to air conditioning systems designed to separate water from air, and, in particular, air condition systems employing wet plenum designs.

BACKGROUND OF THE INVENTION

In air conditioning systems, and, in particular, air conditioning systems that can be employed in the automotive area, numerous designs for air conditioning, and, in particular, HVAC units, have been employed. There are many designs, some using plenums or internal dividing walls within the HVAC units, some without use of such plenums. Such water separator plenums in the prior art normally employ smooth walls and rely on the directional changes in the air flow path to remove water content. However, HVAC units with wet plenum designs have often had the difficulty of not being able to efficiently or effectively, remove water from the air, and, particularly, from fresh air, that is introduced into the unit, due to entrainment prior to the outtake of the air from the unit.

OBJECT OF THE INVENTION

It is an object of the invention to design an air conditioning system, and, more particularly, an air conditioning system that can be used effectively in the automotive or motor vehicle area, that can remove or separate water from outside air. It is a further object of the invention to provide for a HVAC unit with special features to allow efficient and/or effective separation and/or removal of water from the outside air prior to the airstream being introduced inside the cabin of the vehicle. A further object of the present invention is to provide for better water separation from air prior to distributing conditioned air to the appropriate areas of need within the motor vehicle.

SUMMARY OF THE INVENTION

The present invention relates to air conditioning systems, and, in particular, air conditioning systems comprising HVAC units used in automotive or motor vehicle applications, that are capable of effectively reducing the amount of water and or other liquids or vapors from air. In its preferred embodiments, the present invention provides for air conditioning systems wherein fresh air enters the air conditioning system in an intake area, and, upon entry into an outtake area, has a reduced water content relative to the air in the intake area. Preferably, the reduction in water content relative to the air in the intake area is of the magnitude that no water droplets reach the air outtake area or areas.

In preferred embodiments of the present invention, the air conditioning systems, and, in particular, the HVAC units, have a general housing and a water separator in a housing, the housings having external and internal features. External features are features that may be in contact with the outside air, but do not normally have contact with the air that eventually enters and comes through the intake areas of the HVAC unit. Internal features are features, such as features on the internal or interior HVAC unit wall, that have contact with air after it enters or 'intakes' into the HVAC unit. In preferred embodiments of the present invention, the water separator is positioned in the HVAC unit so as to allow for air from the intake area ('water-filled' air) to flow or follow a 'downward' or 'gravity directed' air flow path towards a lower portion of the HVAC unit, and, in particular, the water separator portion of the HVAC units. The air then flows upward, or in a counter gravity directed 'upward' air flow path, to take advantage of gravity and centripetal force for separating the water from the airflow. In preferred embodiments of the present invention, the airflow that passes the intake surface of the internal dividing wall will pass beneath or under an internal vertical surface of the wall and be 'water-reduced'. Prior art water separators, though allowing water to collect on the internal vertical walls, cause the water to fall directly into the path of the airflow as it comes around the wall and pick up water molecules from the drips that come off the separator wall (air become 'entrained'). This entrained air (with water) then risks to leave the water separator in the outtake air path and undesirably enter further into the interior of the HVAC unit.

In preferred embodiments of the present invention, internal features may comprise part of the internal dividing wall(s) of the HVAC unit or be attached thereto. Internal features, for example, may be molded to the interior wall (and, specifically, to the internal dividing wall(s) of the water separator) of an HVAC unit or to the inside of a water separator housing. It has surprisingly been found that the internal features of the HVAC unit, and preferably, the internal features of the water separator internal dividing wall, remove, or otherwise reduce, the amount of water content in outtake air, when a particular design is used.

In preferred embodiments of the present invention, an internal feature such as a raised surface (rib) on the air intake air flow side of the internal dividing wall exists. Such a rib or, preferably, rounded rib, is located on the surface of the water separator internal dividing wall. More preferably, this internal feature exists on a surface where the air flow is in a downward direction (air intake surface). In further preferred embodiments of the present invention, the HVAC unit water separator internal dividing wall has a least one rib, even more preferably, a plurality of ribs. The at least one rib or ribs tend to increase the separation of and/or reduce the moisture in air that comes from the intake area or areas of the HVAC or water separator housing unit, prior to the air arriving to or leaving at the outtake section of the HVAC or water separator housing unit. In preferred embodiments of the present invention, the ribs are permanently attached or fixed to what previously was a separate piece to form a one piece wall and rib assembly (ribbed wall). In more preferred embodiments the ribbed wall is molded as one unit (molded ribbed wall).

The ribs, as described above, can stand alone or form patterns. In preferred embodiments of the present invention, the rib or ribs are generally spaced on the air flow side (air intake side) of the internal dividing wall. In preferred embodiments of the present invention, where there are a plurality of ribs, the ribs are normally spaced at a distance from about 10 to about 100 mm from one another. More preferably the ribs are spaced at a distance from about 20 to about 40 mm from one another, even more preferably the ribs are spaced approximately equidistant in relation to one another.

Where there is more than one rib, preferably, at least two of the ribs follow a path roughly parallel to one another (roughly parallel orientation), more preferably, a plurality of ribs follow a path roughly parallel to one another, and, at an angle with respect to the horizontal. In more preferred embodiments, the at least one rib extends to within 30 mm of the intersection or junction of an adjacent or side wall surface with the internal dividing wall in order to allow the collected water (water deposited from the airflowing over or around the internal dividing wall), to drain at the far ends of the internal dividing wall rather than in the center of the internal dividing wall. Preferably, water flows towards and at a junction between the internal dividing wall and the adjacent or side walls of the water separator housing. The ribs and particularly the plurality of ribs, have a downward slope when the HVAC unit is functioning with respect to the horizontal. This allows the collecting water to more or less slide off the internal dividing wall to the adjacent or side walls of the water separator for eventual drainage at the base of the water separator.

In more preferred embodiments of the present invention, the at least one rib is found in the form of a 'V' or chevron. The 'V' or chevron or plurality of 'Vs' or chevrons can be arranged in a specific manner. By arranging in a specific manner, the at least one 'V' or chevron or plurality of 'Vs' or chevrons can form specific patterns or forms.

In one particularly preferred pattern, the at least one V or chevron has sides or arms of the V or chevron, that spread out or extend from the midline of the V or midpoint of the chevron towards the outward edge of the water separator internal dividing wall, such that the water 'removed' from the air, that has accumulated or is associated with the wall of the water separator, is drawn, aided by gravity, in a direction towards the outer edge of the internal dividing wall and the adjacent or side wall of the water separator housing and away from the center body of the water separator internal dividing wall, towards, and, to the adjacent or side walls. In this way, the water or moisture is channeled away from zone X, below the water separator internal dividing wall, zone X being where the highest likelihood of undesirable entrainment can occur.

Ribs also range in height as measured from intake air surface of the internal dividing wall. The height may range from greater or equal to about 1.5 mm, more preferably from about 3 mm to about 20 mm, even more preferably the height is between about 5 mm and about 15 mm.

The shape of the rib can also have an influence on the functioning of the water separator of the HVAC unit. Preferably, the ribs are placed on the internal dividing walls in designs or patterns resembling straight or curved lines. Though ribs can be straight or curved on the internal dividing wall, relatively straight ribs, allowing for a more direct path and possibly allowing for less resistance to flow of water towards the adjacent or side wall, are preferred. Preferred shapes in a rib cross section view show ribs with straight flat surfaces and corners with radii.

The internal dividing wall, with a rib or ribs, can be either integrally molded as one part or piece or comprise separate pieces or parts prior to assembly. The wall with rib or ribs (ribbed wall) can be made of a number of materials. Preferably the ribbed wall is made of a plastic or resin or plastic or resin like material, more preferably, the ribbed wall and ribs are made out of a polypropylene or nylon like material.

The water separator internal dividing wall of the present invention, therefore, is placed as to create a 'turn' or change of flow of air, around the base of the separator, i.e., under the internal dividing wall, forcing the air, first, in a downward direction. Water that is present in this air, subsequently, has a tendency to collect on the internal dividing wall of the water separator. The present invention, by placing at least one oriented rib, of preferably, a plurality of ribs on the wall, allows for the water separated from or taken out of the air flow to be channeled from the ribbed wall to a position near the internal adjacent wall or side of the water separator housing, the location where a minimum amount of undesirable entrainment can occur.

Preferred embodiments of the present invention, therefore, not only diminish or reduce the majority of the water content or moisture from fresh air at the intake area or areas, but also channel water that is separated from, taken out of, diminished, reduced or essentially eliminated (removed) from the fresh air from the intake area out of the air path prior to the air reaching the outtake area or areas and prevent re-uptake (entraining of water) in the air reaching the outtake area.

In preferred embodiments of the present invention, water content or moisture that collects on the internal dividing wall is displaced laterally towards internal corners formed at the junction of the internal dividing wall with the adjacent or side wall, On the internal dividing wall, the ribs displace or channel the water downward or following a downward slope laterally towards the sides of the adjacent or side wall to prevent the water from re-entering the air flow (becoming entrained) near zone X as the air flows 'upward' towards an outtake area. The embodiments of the present invention, therefore, allow for the water 'removed' from the intake air to stay, in contact with or 'affiliated' with the internal dividing wall surface and subsequently transferred or channeled from the surface of the internal dividing wall to the adjacent side walls. The water then can flow along the adjacent side wall to the floor or base of the water separator portion of the HVAC unit and exit the water separator through a drain. Any air that passes beneath the interior dividing wall will, therefore, not have a substantial amount of water 'falling' into its path, thus eliminating entraining.

The outtake area of the water separator portion of the HVAC unit is preferably prior to or 'upstream' of the HVAC air distribution means, such as a fan or blower, used to distribute the air from the outtake area to the rest of the air conditioning system. By delivering less humid or 'moisture decreased' or 'dry' air to the HVAC air distribution means, such as a fan or blower, the work on the air distribution means is diminished, and the air temperature can be more effectively controlled and or regulated to increase comfort in the final distribution areas for the air of the air conditioning system.

In preferred embodiments of the present invention, the means for removal of humidity or water from the water separator portion of the HVAC unit is a drainage means, such as a channel or drain or other feature comprising an opening from the interior to the exterior of the water separator portion of the HVAC unit. Preferably, the channel or drain or other feature comprising an opening, opens on one side to the interior side of the water separator portion of the HVAC and on the other side exterior to the water separator portion of the HVAC. Preferably, the channel or drain or other feature comprising an opening is positioned on the lowest surface, e.g. the floor or base of the water separator portion of the HVAC unit, where gravity will permit the maximum amount of drainage. In other words, the channel, drain or other feature comprising an opening is generally positioned to be located in a region where the removal or drainage is gravity assisted, i.e. the force of gravity aids the maximum removal of the water. More preferably, the channel, drain or other feature comprising an opening is positioned so that the humidity or water removed from the HVAC unit is removed or drained via a path with a minimum of detours into the channel, drain, or other feature comprising an opening.

In preferred embodiments of the present invention, ribs meet with, and, under HVAC working condition guide and/or can control the direction of the air flow.

DETAILED DESCRIPTION OF THE PREFERRED EMBODIMENTS

Figure 1:
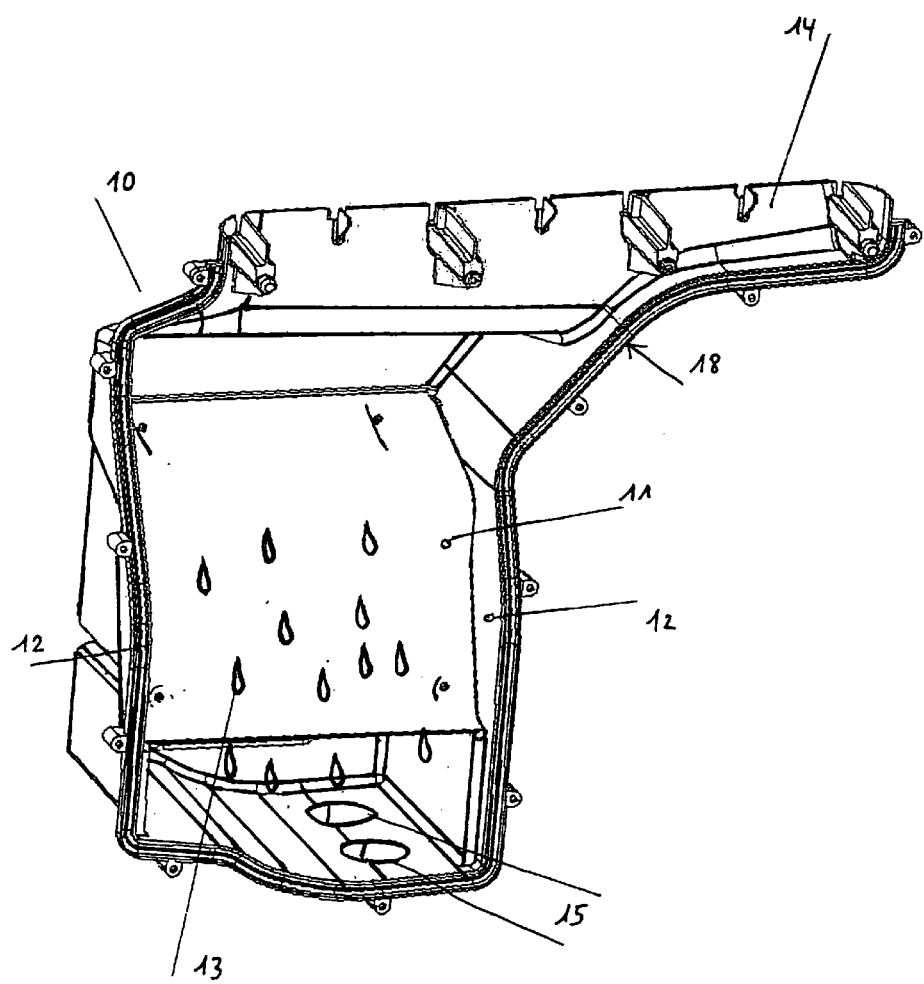
FIG. 1 shows the interior wall of a prior art HVAC unit, particularly an HVAC unit with a wet plenum.
Figure 2:
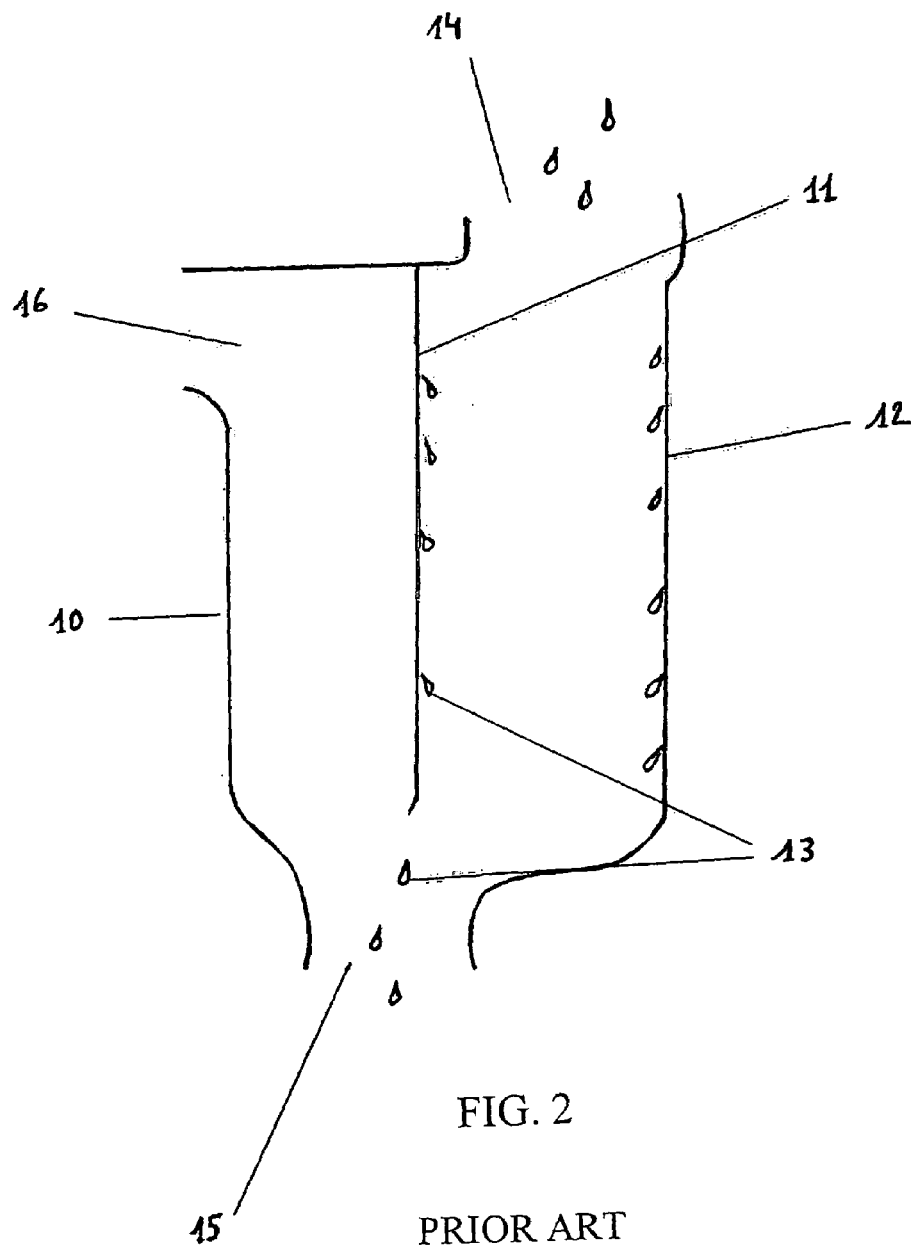
FIG. 2 shows a cross sectional view of a prior art internal dividing wall in a water separator.

Referring to FIG. 1 and FIG. 2, a prior art air conditioning system used in automotive applications having an HVAC unit, water separator housing 10, air inlet area 14, air outtake area 16, internal dividing wall 11, adjacent or side walls 12, and water droplets from air 13. FIGS. 1 and 2 further show drains 15 at the floor or base of the water separator portion 18 of the HVAC unit.

Figure 3:
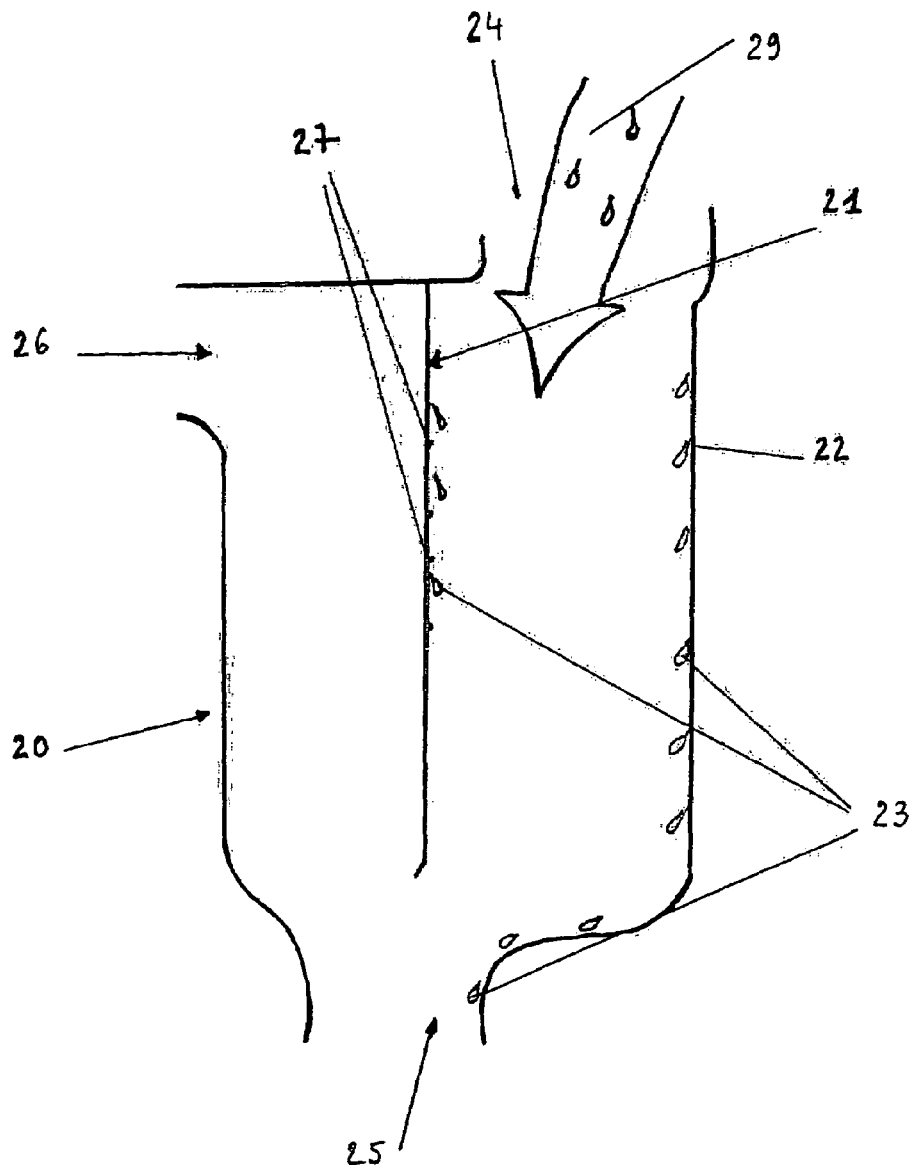
FIG. 3 shows a cross-sectional view of ribbed internal dividing wall, in accordance with an aspect of the present invention.

Referring to FIG. 3, is shown an interior or internal dividing wall 21 found inside an HVAC unit. Internal dividing wall 21 has ribs 27 to allow moisture or 'water filled' air 29 which flows against the wall 21 coming from intake area 24, to reduce its level of water as it flows downward. The water droplets 23 follow the slope of the ribs 27 and the interior surface of the adjacent walls 22, with the assistance of gravity, to a drain position 25 where the water can be drained from the water separator portion of the HVAC unit.

Figure 4:
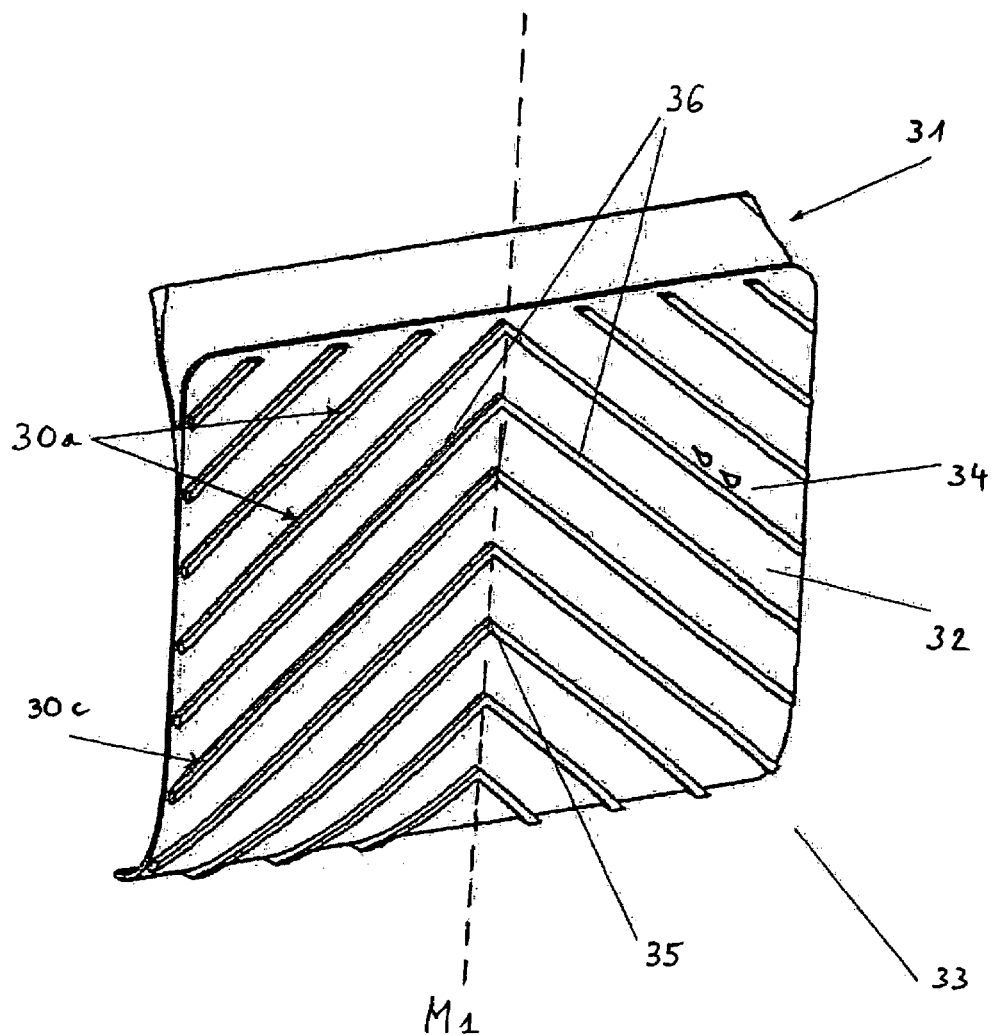
FIG. 4 shows an internal face-on view of an internal dividing wall with a chevron rib pattern, in accordance with an aspect of the present invention.

Referring to FIG. 4, is shown an alternative design of internal dividing wall 33 found inside an HVAC unit. Internal dividing wall 33 has ribs 30a in a V or chevrons rib pattern 30c on the air intake surface of the internal dividing wall 32 to allow air from the air intake area 31 which flows against it to reduce its level humidity or water content. Water 34 flows downward and internally to arrive, with the aid of gravity, at an eventual drain position where the water can be drained through a channel or drain from the HVAC unit. Chevron midline M1 is shown, with chevron midpoint 35 and chevrons arms 36 illustrated.

Figure 5:
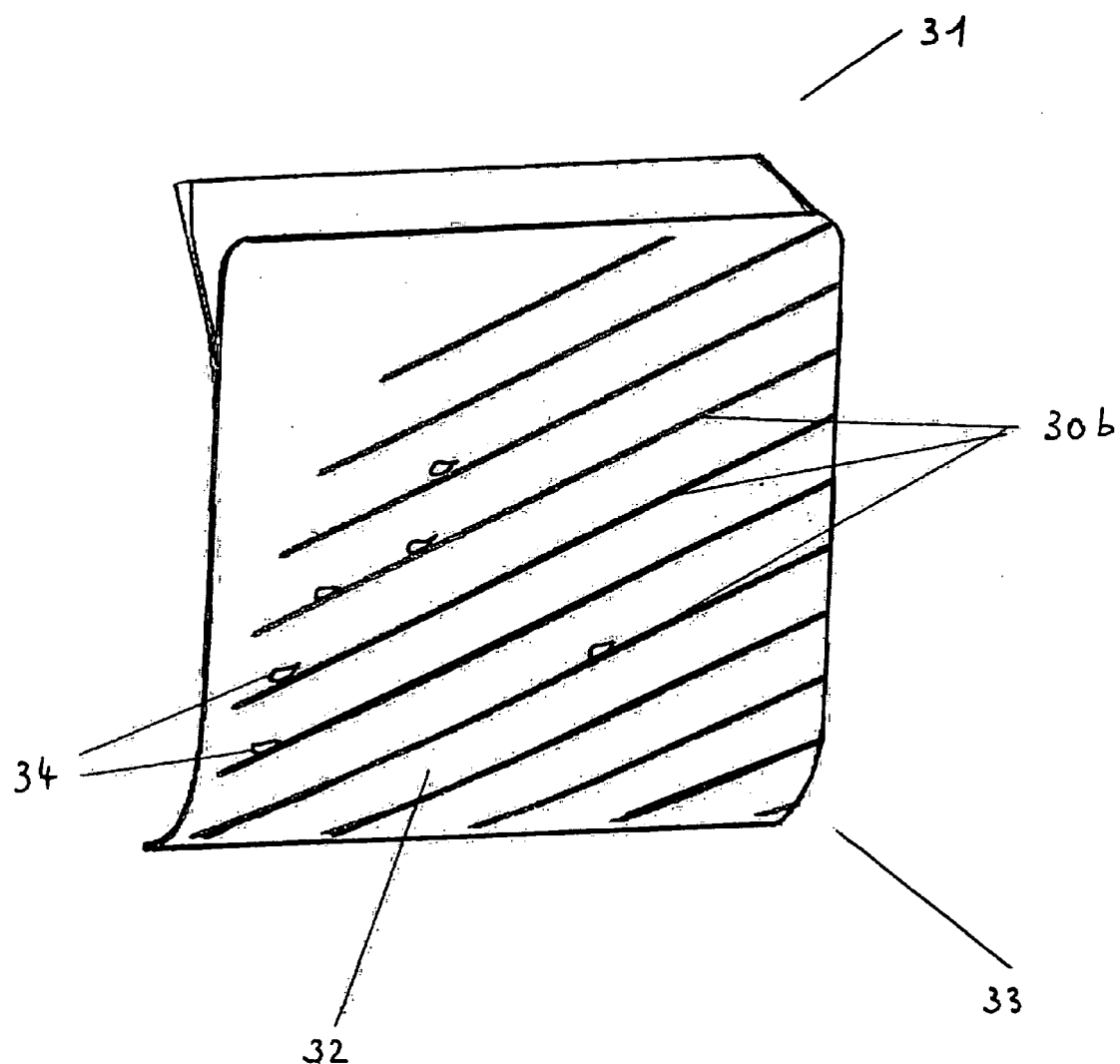
FIG. 5 shows an internal face-on view of an internal dividing wall with another rib pattern, in accordance with an aspect of the present invention.
Figures 6A, 6B:
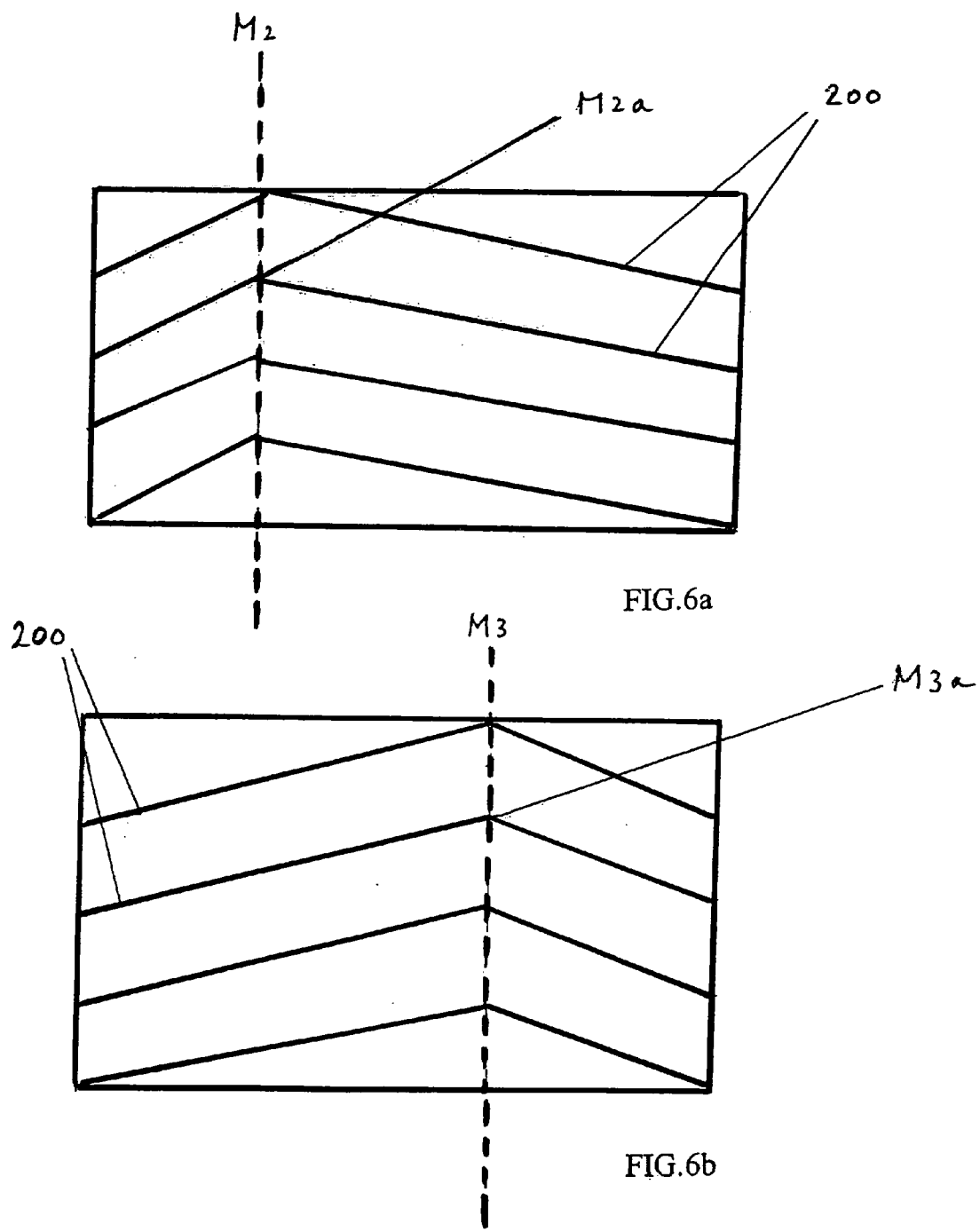
FIG. 6a–d show a number of different rib patterns on an internal dividing wall, with midpoints and midlines illustrated, in accordance with an aspect of the present invention.
Figure 6C:
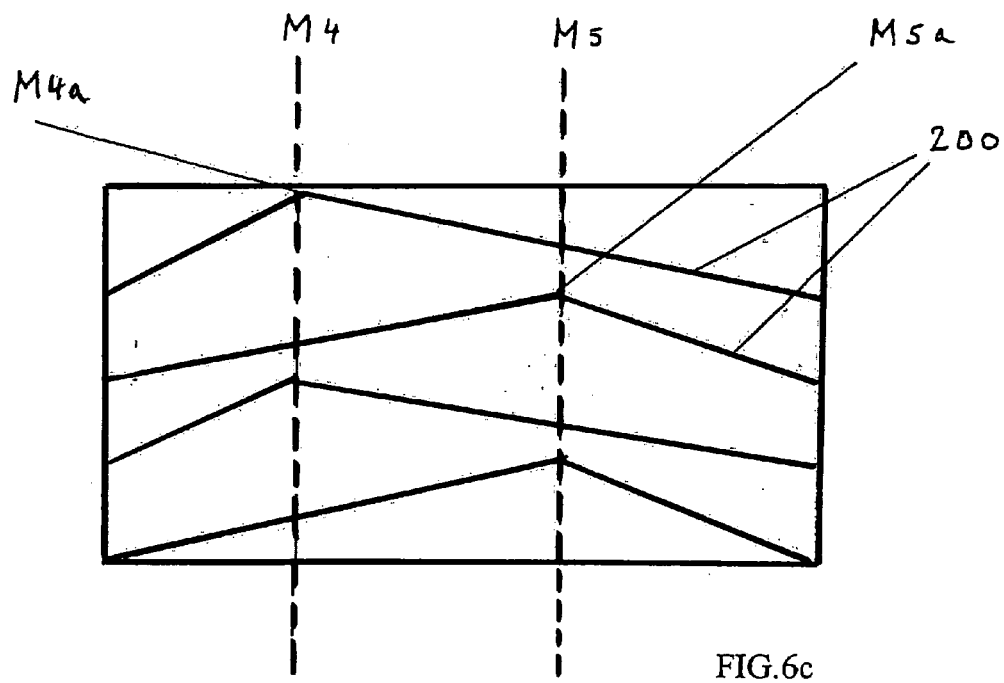
Figure 6D:
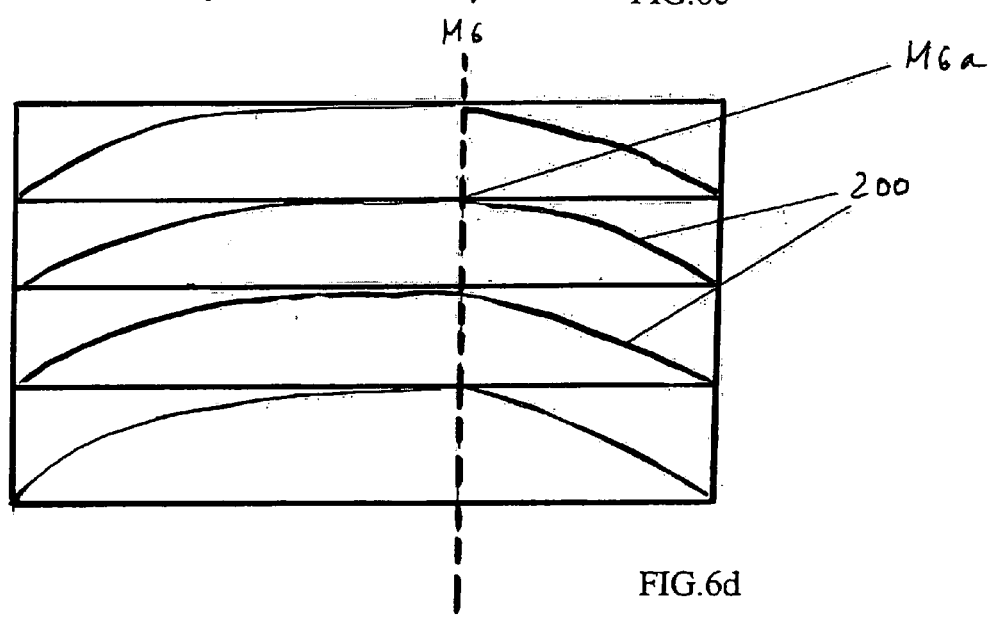

Referring to FIG. 5, is shown an alternative design of internal dividing wall found inside an HVAC unit. Internal dividing wall 33 has ribs 30b in a specific rib pattern to allow air from the air intake area 31 which flows against it to reduce its level humidity or water content. Water 34 flows downward and internally to follow, with the aid of gravity, to an eventual drain position where the water can be drained through a channel or drain from the HVAC unit.

FIGS. 6a, 6b, 6c and 6d show midlines M2, M3, M4, M5, M6 and midpoints or inflection points M2a, M3a, M4a, M5a M6a of various patterns of ribs 200.

Figure 7:
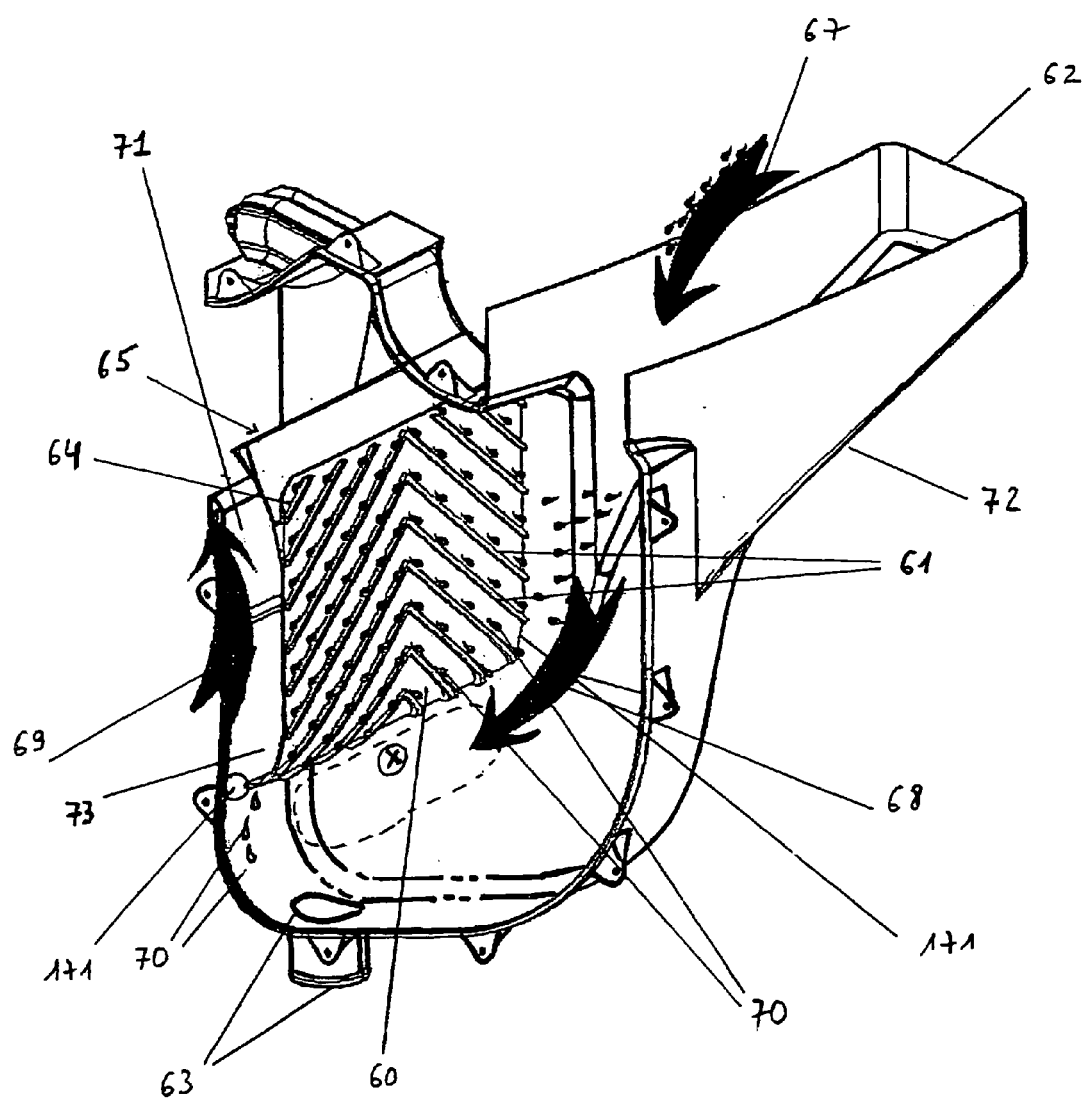
FIG. 7 shows a cut-away view of a water separator portion of an HVAC with internal dividing wall and a rib in chevron pattern, in accordance with an aspect of the present invention.

Referring to FIG. 7, is shown a water separator portion of HVAC with water separator housing 72 and with internal dividing wall 60 with chevron or V shaped ribs 61 found inside housing 72. Ribbed wall 60 allows air 67, 68 which flows against it to reduce its level of humidity or water 70 to flow downward to a position where water 70 can be drained through a channel or drain 63 from the HVAC unit. Junction 171 at or between the internal dividing wall 60 and water separator housing 72 is provided whereby water reaches the side wall 73 of the housing, and, with the aid of gravity, is eventually drained through drain 63.

FIG. 7 further illustrates entraining zone X wherein water from the surface of the internal dividing wall should not pass or it will be re-absorbed or re-entered the airstream. Intake air 67 having a heavy water 70 content, flows trough intake area 62 against ribbed 64 internal dividing wall 60, and continues with water reduced or removed air in air flow 68. The water 70, separated from the air, flows along the interior of the adjacent or sidewall 73 of the lower portion of the water separator housing 72, to be drained through drain 63. The post water separation air flow 69, flows upward towards the outtake area 71, with much lowered humidity or water content.

Figure 8:
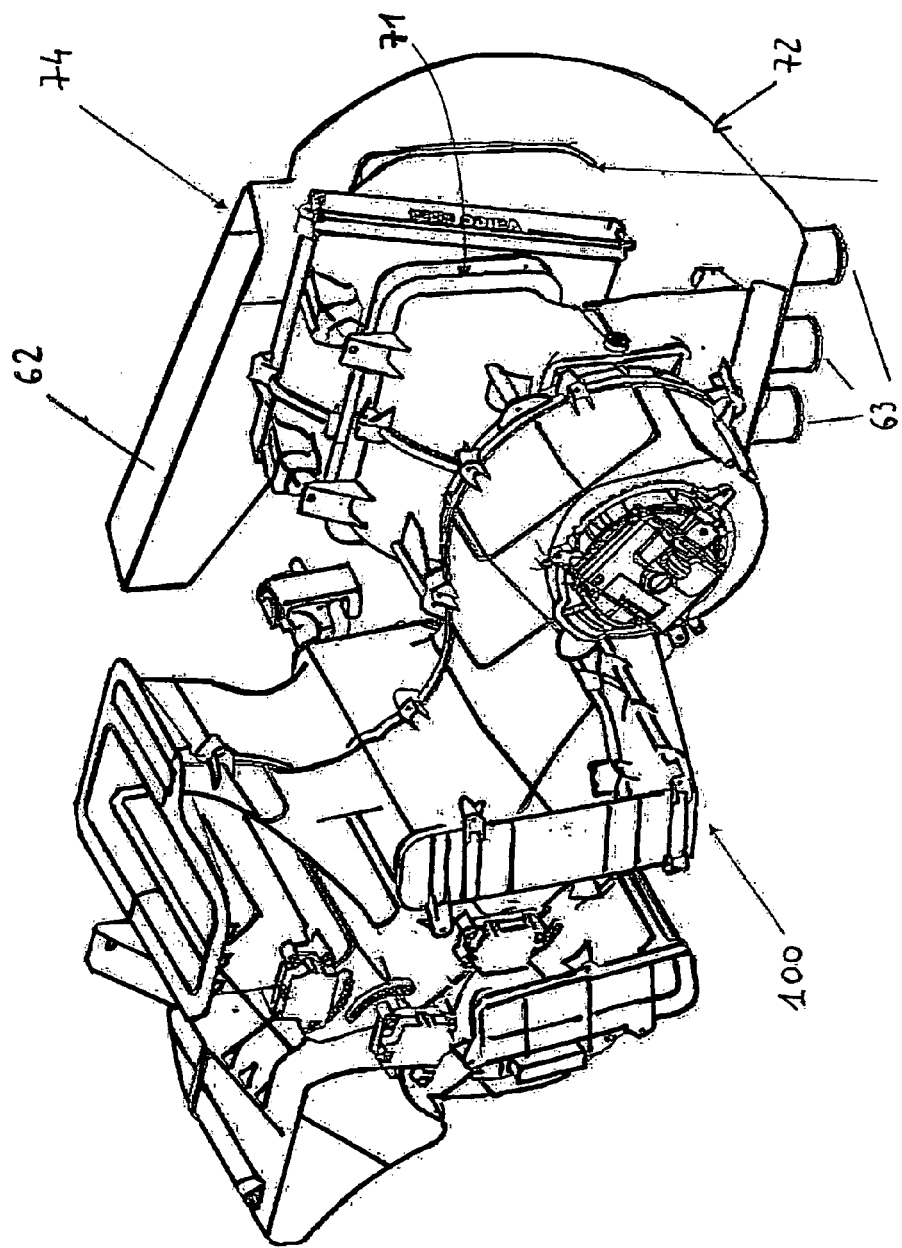
FIG. 8 shows an HVAC system assembled to perform the moisture reduction function, in accordance with an aspect of the present invention.

Referring to FIG. 8 is shown an HVAC unit 100, with water separator portion 74, and air inlet area 62. Water separator housing 62 accepts the air flow prior to its entry into air outtake area 71. Water from air leaves the water separator housing 72 via drain 63.

Figure 9:
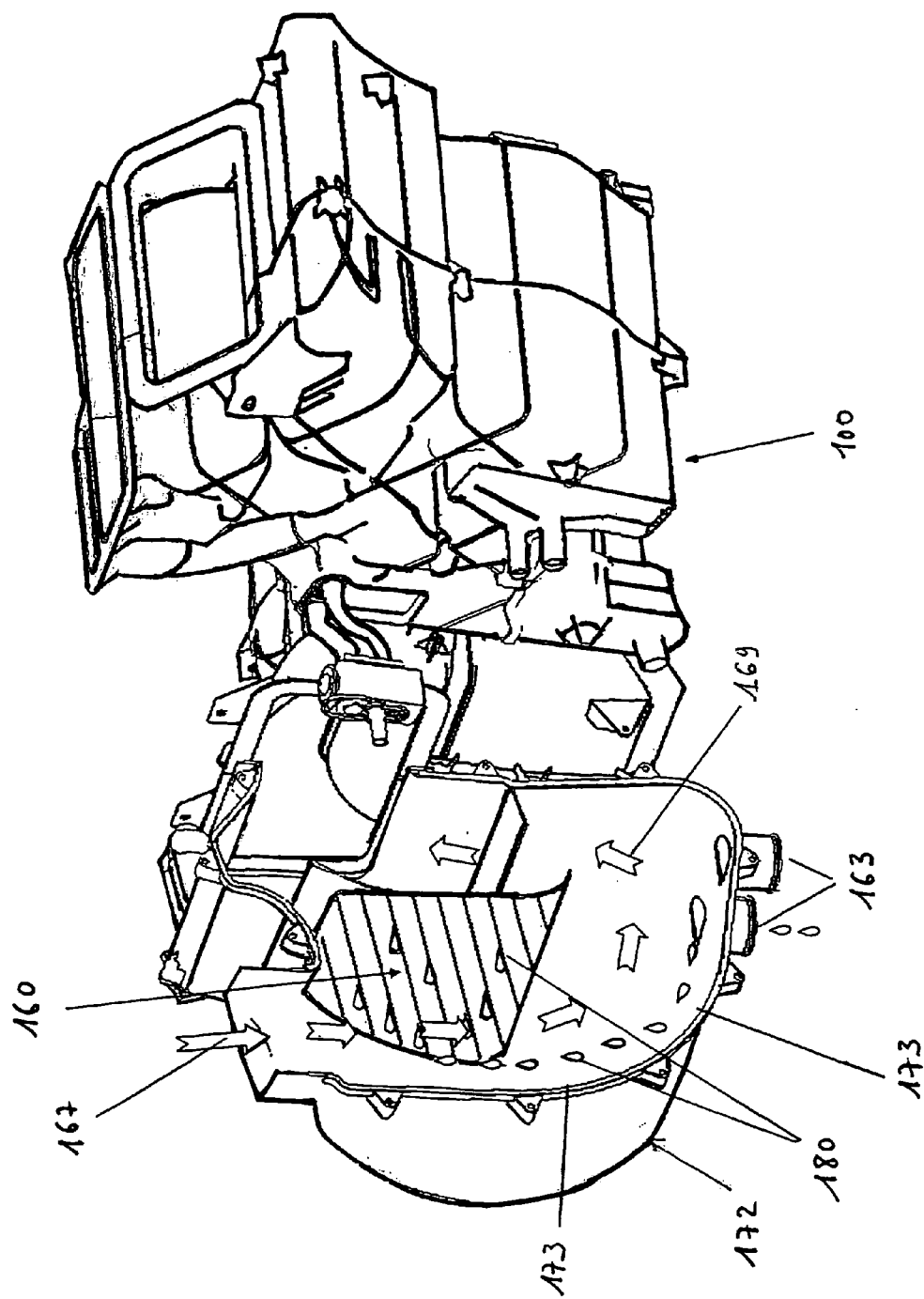
FIG. 9 shows a cut-away view of an HVAC system having an internal dividing wall and adjacent or side walls and drains, assembled to perform the moisture reduction function, in accordance with an aspect of the present invention.

Referring to FIG. 9, HVAC unit 100 as in FIG. 8 is shown, with ribbed internal dividing wall 160 located within water separator housing 172. Intake air flow 167 flows against internal dividing wall 160, resulting in water droplets 180 that flow along wall 160 toward adjacent wall 173 and downward towards drain 163. Air flow 169 continues upward post water separation prior to distribution.

The preferred embodiment of the present invention has been disclosed. A person of ordinary skill in the art would realize, however, that certain modifications would come within the teachings of this invention. Therefore, the following claims should be studied to determine the true scope and content of the invention.

Unless stated otherwise, dimensions and geometries of the various structures depicted herein are not intended to be restrictive of the invention, and other dimensions and geometries are possible. Plural structural components can be provided by a single integrated structure, for example. In addition with a feature of the present invention, may have been described in the context of one of the illustrated embodiments, such features may be combined with one or more other features of other embodiments for any given application. It will also be appreciated from the above that the fabrication of the unique structures herein and the operation thereof also constitute methods in accordance with the present invention.

What is claimed is:

1. An air conditioning system having a HVAC unit comprising:

a water separator having a housing with an interior side wall surface;
a water separator air intake area;
a internal dividing wall within the housing;
at least one rib on the air intake surface of the internal dividing wall;
an air outtake area; and,
a junction at the interior side wall surface and the internal dividing walls,
wherein the at least one rib extends to within 30 mm of the junction, and wherein the water separator air intake area is upstream of the internal dividing wall, and the internal dividing wall is oriented such that water forms on the internal dividing wall from water-filled intake air flowing against the internal dividing wall before continuing as water-reduced air and flowing to the air outtake area.

2. An air conditioning system as in claim 1, having a plurality of ribs, wherein the plurality of ribs slopes downward when the HVAC unit is in proper operating position.

3. An air conditioning system as in claim 2, wherein the plurality of ribs forms a pattern comprising at least one chevron.

4. An air conditioning system as in claim 2, wherein the plurality of ribs forms a pattern comprising at least two ribs parallel to one another.

5. An air conditioning system as in claim 4, wherein the pattern comprises a plurality of ribs molded on or with the internal dividing wall.

6. An air condition system as in claim 2, wherein water from water-filled air is directed or channeled to the internal side wall of the water separator housing to prevent it from being entrained.

7. An air conditioning system as in claim 2, further having an entraining zone.

8. An air conditioning system having a HVAC unit comprising:
a water separator having a housing with an interior side wall;
a water separator air intake area upstream of the internal dividing wall;
a internal dividing wall within the housing;
at least one pattern of ribs on the internal dividing wall;
a junction at the interior side wall surface and the internal dividing wall,
wherein the at least one rib extends to within 30 mm of the junction:
a drainage means; and,
an air outtake area, wherein the pattern of ribs has a plurality of sloped ribs in a roughly parallel orientation and the internal dividing wall is oriented such that water forms on the internal dividing wall from the water-filled intake air and the water flows, with the aid of gravity, towards the interior side wall of the water separator prior to being drained from the HVAC unit.

9. An air conditioning system as in claim 7, wherein the internal dividing wall is a molded ribbed wall.

10. An air conditioning system as in claim 8, wherein the pattern of ribs has at least one chevron.

11. An air conditioning system as in claim 10, wherein the pattern of ribs has a plurality of Vs or chevrons, and the Vs or chevrons are spaced at a distance of about 10 to 100 mm from one another.

12. An air conditioning system as in claim 8, wherein at least one rib has a midpoint or midline from which arms extend towards the outward edge of the internal dividing wall.

13. An air conditioning system as in claim 12, wherein a plurality of ribs has a midpoint or midline from which arms extend towards the outward edge of the internal dividing wall.

14. A method for reducing the water contact of intake air in an HVAC unit with water separator portion comprising:
providing for ambient or water-filled intake air to enter and flow in a water separator housing;
flowing the ambient or water-filled air against a ribbed internal dividing wall to remove water from the water-filled air;
channeling water via the ribs towards a junction of the internal dividing wall and an internal side wall of the water separator housing;
providing water reduced air to the air outtake area of the water separator.

* * * * *